United States Patent [19]

Gallagher

[11] Patent Number: 4,913,504
[45] Date of Patent: Apr. 3, 1990

[54] DOCUMENTS OR LIKE ARTICLES BEARING HOLOGRAMS

[75] Inventor: Terence J. Gallagher, Brookfield, Conn.

[73] Assignee: American Bank Note Holographics, Inc., Elmsford, N.Y.

[21] Appl. No.: 137,747

[22] Filed: Dec. 24, 1987

Related U.S. Application Data

[62] Division of Ser. No. 827,656, Feb. 7, 1986, Pat. No. 4,728,377, which is a division of Ser. No. 439,935, Nov. 8, 1982, abandoned.

[51] Int. Cl.$^4$ ................................................ G03H 1/00
[52] U.S. Cl. ..................................................... 350/3.6
[58] Field of Search .......................... 156/230; 283/86; 350/3.6; 430/162.18, 12, 10

[56] References Cited

U.S. PATENT DOCUMENTS 3,623,944 11/1971 Davis ................................. 156/230

FOREIGN PATENT DOCUMENTS 1517840 7/1978 United Kingdom .
1568563 6/1980 United Kingdom .

*Primary Examiner*—Bruce Y. Arnold
*Attorney, Agent, or Firm*—Cooper & Dunham

[57] ABSTRACT

A document or like article produced by a process which provides a three-dimensional, light-diffracting pattern comprising a hologram on a surface of a transparent material layer which may be extremely thin and non-self-supporting, and which secures this layer to a document or like substrate, with the pattern-bearing surface facing downwardly (i.e., not exposed), by an adhesive bond having a shear strength greater than that of the transparent layer so that the layer cannot be removed from the surface without being destroyed.

10 Claims, 3 Drawing Sheets

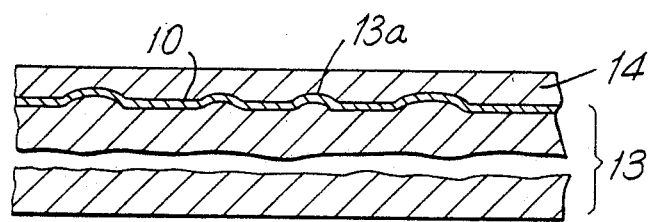
FIG. 7A
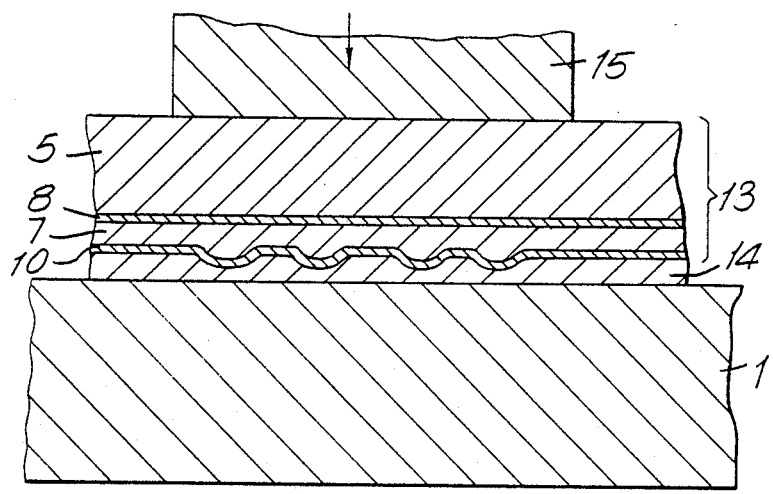
FIG. 7B
FIG. 8A
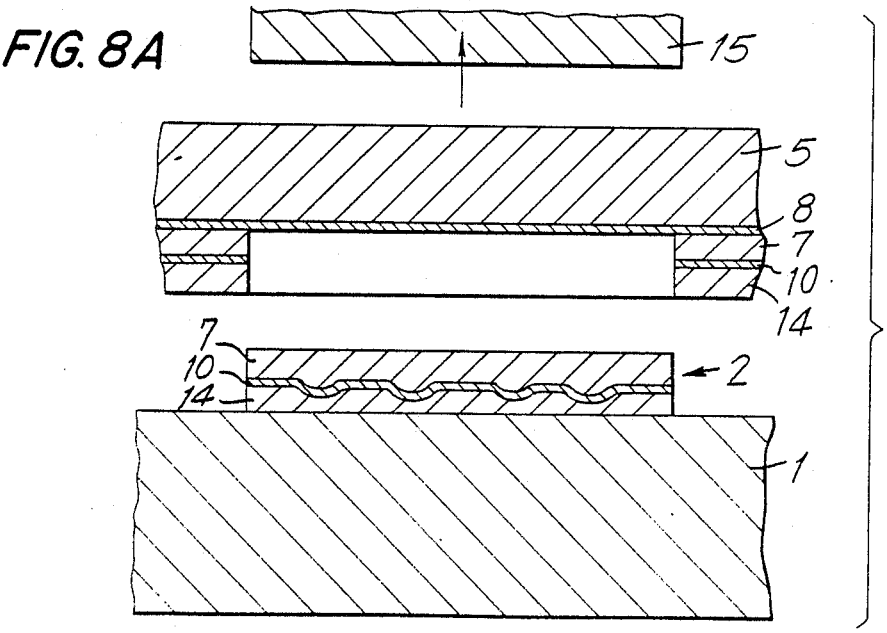

DOCUMENTS OR LIKE ARTICLES BEARING HOLOGRAMS

CROSS REFERENCE TO RELATED APPLICATIONS

This application is a division of applicant's copending United States patent application Ser. No. 827,656, filed Feb. 7, 1986 (now U.S. Pat. No. 4,728,377), which is a division of applicant's United States patent application Ser. No. 429,935, filed Nov. 8, 1982 (now abandoned).

BACKGROUND OF THE INVENTION

This invention relates generally to the field of light diffraction patterns, such as holograms or diffraction gratings, and is specifically directed, although not restricted, to articles produced by a method of machine application of holograms to paper and other substrates.

The construction of so-called "surface relief" holograms have been described by a number of authors, including Bartolini et al., whose paper appeared in Applied Optics, Vol. 9, #10, in October 1970, pp. 2283-2290. This same paper describes methods of creating from photoresist holograms, nickel stamping dies which are subsequently used to emboss holograms into plastic sheet material. The methods of holography embossing, however, are not restricted as to technique, and one can use conventional embossing plates or rollers.

SUMMARY OF THE INVENTION

It is a primary object of this invention into provide a technique for the application of thin, fragile embossed material to a suitable substrate. The substrate can be very textured, and flexible as with some papers for example.

It is also an object to provide a technique which provides easy handling and machine processing of these materials by the use of a carrier web. This web may be manifested as rolls of material.

It is another object of this invention to create documents containing gratings or holograms which are tamperproof by virtue of their fragility since they are destroyed by attempts to remove them from the document or other substrate.

The success in meeting these and other objects will be apparent from the following discussion.

The process of making a hologram or diffraction grating according to the invention begins with the making of a die having in its face a light interference pattern in relief. In one embodiment of the process, laminated sheet material is prepared for receiving an embossment of a light diffracting pattern. This laminated sheet material includes a support layer, a release coat covering the support layer, one or more layers of thermoplastic material overlying the release coat and less sensitive to heat than the release coat, and a layer of foil, preferably metal, less than 1000 Angstrom units in thickness and bonded to the surface of the thermoplastic layer opposite to the release coat.

The die is impressed into the foil and the adjacent thermoplastic layer to form an embossed light diffracting pattern therein. The embossment may be deeper than the thickness of the foil. The foil is then covered with an adhesive layer. The laminated sheet material is then inverted and pressed against the flexible substrate, e.g., paper, by a suitable pressure plate. This causes adhesion of the foil to the substrate and a separation of the support layer from the layer of thermoplastic material, due to the melting of the release coat. This adhesion and separation occurs only in those areas beneath the pressure plate. In other areas, the foil and thermoplastic layers are retained in contact with the support layer. When the support layer is lifted from the substrate, the foil and thermoplastic layers fracture along the edges of the pressure plate, so that what is left on the substrate is only the area, including the embossment, which was beneath the pressure plate. This process is similar to hot stamping. A major difference, of course, is the step of preembossing the laminated material with very fine diffraction and holographic patterns. Considerable care must be taken to preserve these patterns in this application step, and in selecting suitable release coat, thermoplastic, and reflective materials.

The thermoplastic material is transparent, although it may be colored. The light diffracting pattern, now on the surface nearest the substrate, is visible through the transparent thermoplastic material as a reflection pattern. The three-dimensional effect of a hologram or the iridescent effect of a diffraction grating may be readily observed, through the thermoplastic material.

The process is particularly useful in the preparation of documents of value, since the resulting document with a hologram or diffraction grating is impossible to make without the aid of expensive equipment. The embossed surface, being beneath the outer thermoplastic layer, is inaccessible. Also, the reflective layer and the thermoplastic layer, which constitute the laminated material remaining on the document or other substrate, are so thin that they are not self-supportive. This laminated material can be as thin as 2000 Å. Any attempt to remove it, so as to gain access to the embossed surface or to transfer it to a different substrate (document, etc.), results in its destruction.

The utility of the process and its product is not limited to documents of value, but may be used in the production of trademarks or labels, for example, or in the preparation of any document, or publication, or other record, where a particularly unusual and attractive effect is desired. In the prior art, the embossing and transferring processes are performed simultaneously, whereas with the technique disclosed herein these operations are performed separately. In certain prior art processes, the embossing is carried out through a carrier layer, thus limiting the fineness of the embossed pattern to the point that the embossing of holograms would not be possible, whereas with the technique disclosed herein there is no intervening layer. Such prior art processes result in an unprotected embossed surface which is accessible for tampering, whereas the technique disclosed herein automatically creates a sealed light diffracting surface.

BRIEF DESCRIPTION OF THE DRAWINGS

FIG. 7A shows the material of FIG. 7 after it is coated with adhesive.

FIG. 7B shows an initial step in fastening the embossed areas of the laminated sheet material to a substrate.

FIG. 8A shows the support layer and attached parts of the laminated sheet material separated from the substrate, and an embossed area fastened to the substrate.

DETAILED DESCRIPTION

Figure 1:
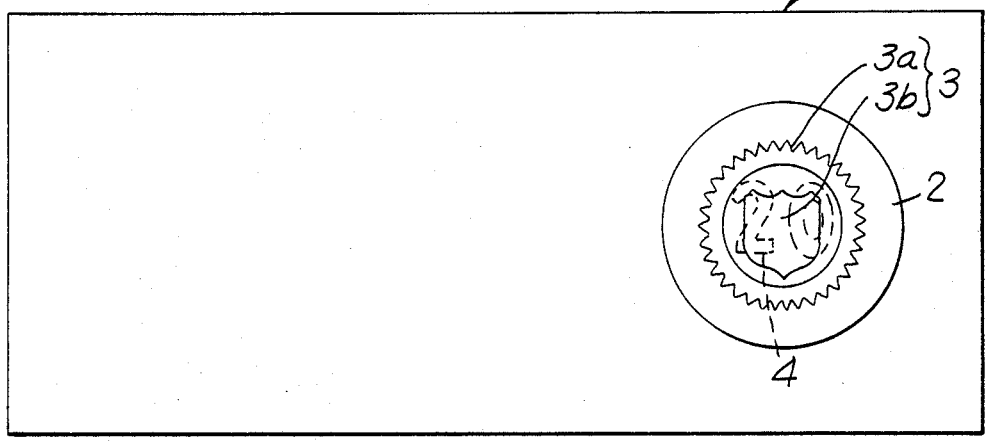
FIG. 1 is a plan view of a document of value carrying a hologram and a diffraction grating produced in accordance with the invention.
Figure 2:
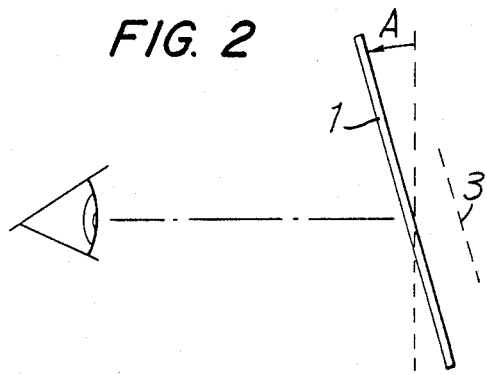
FIG. 2 is an end view of the document of FIG. 1, showing the direction and angle of tilt used to view the hologram image contained in the document.

FIG. 1 illustrates a document of value generally indicated at 1, having applied thereto a circular disc 2 bearing a hologram containing an image of the shield 3 which appears to float in space behind the hologram surface. The disc 2 also carries a diffraction grating 4, shown in the form of the numeral 20. It is focused on the surface of the hologram and is shown in dotted lines. Both the hologram 3 and the diffraction grating 4 are visible. However, at a particular angle of observation (the angle of tilt A in FIG. 2), the image 3 is more sharply visible, so that the diffraction grating pattern 4 is shown in dotted lines in FIG. 1. The image 3 is shown in FIG. 2 to appear behind the document 1.

Figure 4:
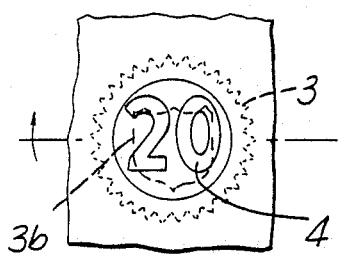
FIG. 4 is a fragmentary view of part of the document of FIG. 1, tilted as in FIG. 3 to emphasize the diffraction grating more than the hologram.
Figure 3:
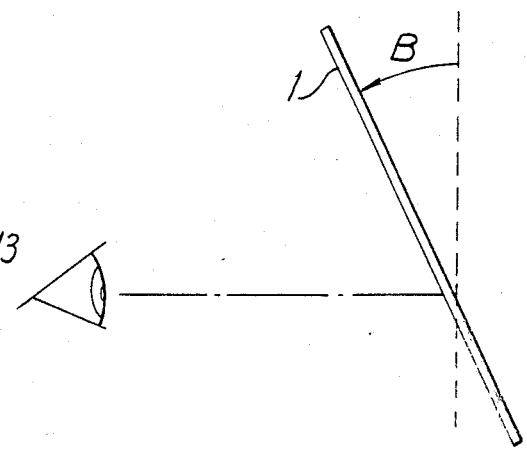
FIG. 3 is a diagrammatic view showing the direction and angle of tilt used to view the diffraction grating.

By tilting the document slightly about a horizontal axis (increasing angle A in FIG. 2 to B in FIG. 3), the diffraction grating 4 may become the predominant visible feature and the components of the image 3 tend to become less prominent, as shown in FIG. 4. Hence, the hologram 3 is shown in dotted lines in FIG. 4. The images contained within the structure depicted in these figures may contain any of a variety of holographic images. Also, it should be apparent that the seal shown here need not be restricted to a circular configuration.

The terms "horizontal" and "vertical" are used in the above description with reference to the document as shown in FIG. 1. "Horizontal" being the long dimension of the document and "vertical" being the short dimension of the document.

FIGS. 5-8

These figures illustrate one embodiment of a process for preparing the embossed hologram and attaching it to the document.

There is first prepared a laminated structure 13 comprising a support layer 5, which may be polyester and which may have a thickness of one-half to one mil. The support layer is covered by a release coat 8, which may be a material which is sharply sensitive to increased heat, e.g., a suitable wax. Over the release coat there is provided a layer of thermoplastic material 6, which is less sensitive to heat, i.e., has a higher melting point than the release coat. A second thermoplastic layer 7 is placed on top of the layer 6 and a layer of thin reflective foil 10, preferably aluminum, is placed over the second thermoplastic layer and bonded thereto.

Both of the thermoplastic layers may be transparent. The layer 6 is chosen for its wear resistant properties since it will be the outside layer on the finished product. A single thermoplastic layer may be used in place of the layers 6 and 7, if its wear resistant properties are suitable.

Figure 5:
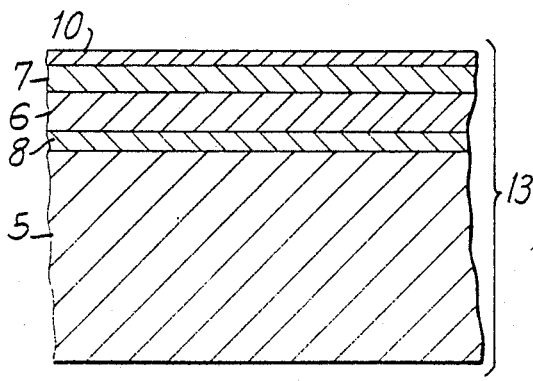
FIG. 5 is a cross-sectional view showing a laminated sheet material used in the process of preparing the documents of FIGS. 1-4.
Figure 6:
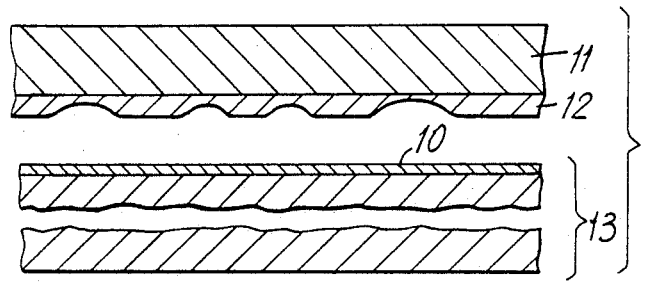
FIG. 6 illustrates the application of an embossing die carrying a light interference pattern to the upper face of the laminated material of FIG. 5.
Figure 7:
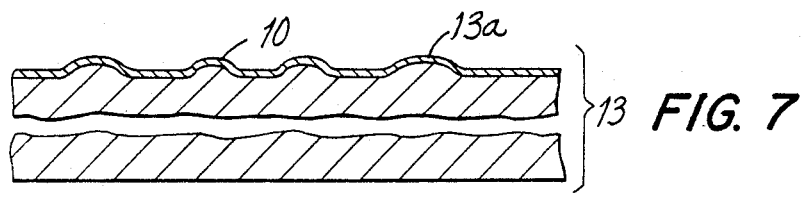
FIG. 7 shows the material of FIG. 5 after the die has embossed a pattern thereon.

After the laminated material 13 of FIG. 5 is prepared, it is placed under a die 11 having a die face 12 formed as a surface relief hologram. This is shown in FIG. 6. Several methods of constructing a metal hologram embossing die are known in the art. The die 11 is pressed against the laminated material 13, thereby deforming the foil 10 and forming an embossment 13a in the laminated material, as shown in FIG. 7. The deformation by embossment may be deeper than the foil thickness as shown at 13a in FIG. 7.

Figure 8:
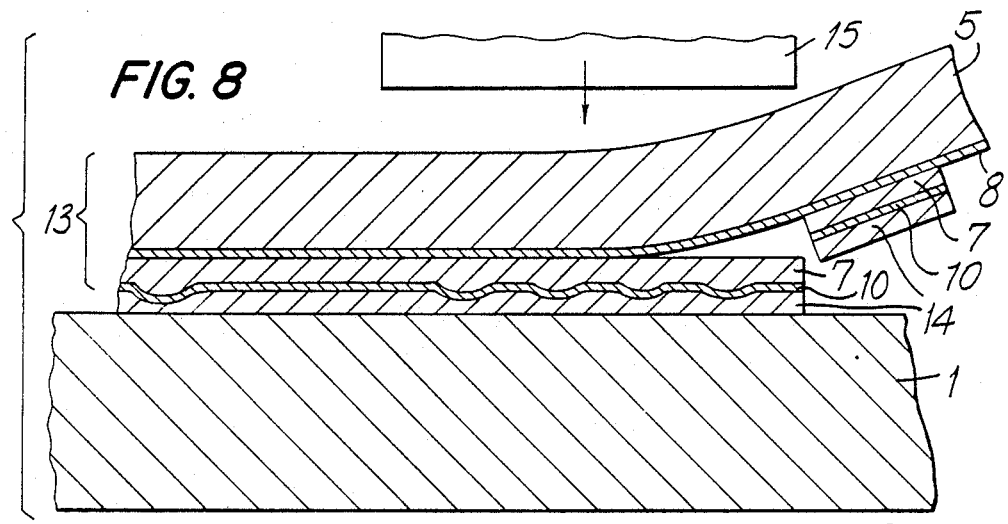
FIG. 8 illustrates the process of fastening the embossed laminated sheet material to a substrate by means of a stamping process.

The foil 10, including the embossment 13a, is now covered with a hot melt adhesive layer 14 (FIG. 7A). As shown in FIG. 7B, the laminated material 13 is inverted and placed upon the substrate to which it is to be attached, which may be the document shown in FIG. 1. The document may bear conventional printing, preferably intaglio. That printing is preferably applied before the process of the invention is carried out, but may alternatively be done later. A pressure plate or stamping die (15 in FIGS. 7B, 8 and 8A) is then applied to the laminated material 13 superimposed on the paper 1 and is held against the laminated material while applying heat and pressure sufficient to cause adhesion of the laminated material 13 to the paper 1. The hot melt adhesive is absorbed into the pores of the paper 1. The bond so created has a shear strength greater than the shear strength of the transparent layer. The release coat 8 melts, allowing removal of the support layer 5 (FIG. 8A). When the support layer 5 is lifted from the substrate 1, the foil 10 and the thermoplastic layers 6, 7, fracture along the edges of the areas under the pressure plate 15, as shown in FIG. 8A, so that what is left on the substrate 1 is only the area, including the embossment, which was beneath the pressure plate. The outer layer is now the thermoplastic layer 6 or 7, both of which are transparent. There is produced on the face of document 1 a disc 2, having a hologram and a diffraction grating visible from its face as described in connection with FIGS. 1-4.

The process described above may be utilized for a single hologram, without an accompanying diffraction grating, or it may be utilized for a diffraction grating without a hologram. It is also possible to use it for a plurality of holograms or a plurality of diffraction grating. A mixture of plural holograms or plural diffraction gratings may be used. The particular image which is observed at any time will depend upon the angle at which the document is tilted by the viewer.

Instead of using a metal foil 10 which is bonded to the surface of the thermoplastic 6, one can deposit, by vacuum deposition, or other methods, a thin layer of aluminum or other reflective material, onto the surface of the thermoplastic 6. Alternatively, this deposition may be carried out after the embossing step shown in FIGS. 6 and 7, but before the application of the adhesive shown as 14 in FIG. 8.

Another possibility of producing the laminated material 13 containing a surface relief hologram, involves casting, rather than conventional embossing.

The hologram laminated layers 6, 7 and 10, which are retained on the document 1, may be as thin as 2000 Angstrom units. This laminate should preferably be so delicate that the material will not hold together, if an attempt is made to transfer the holographic seal from the document 1.

FIG. 9

Figure 9:
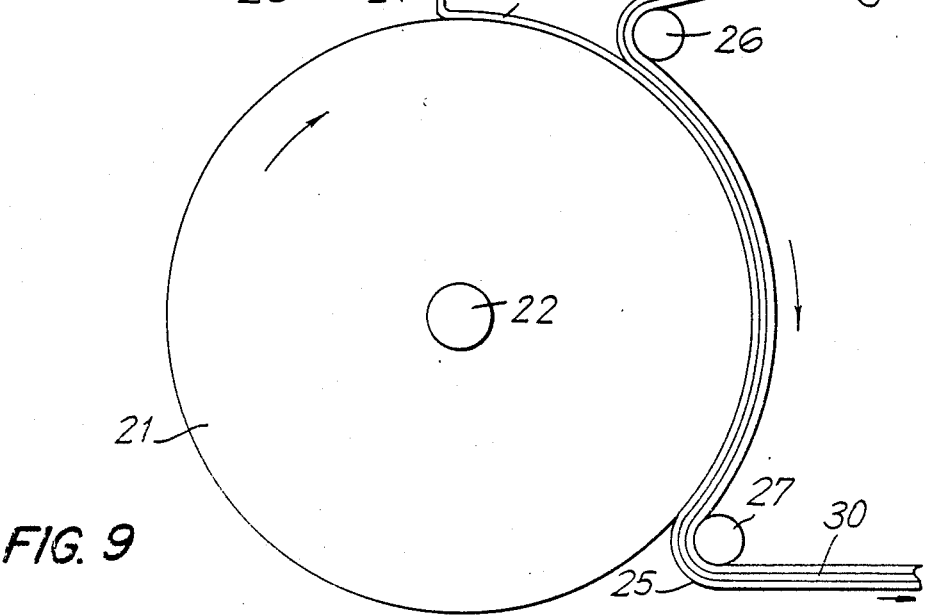
FIG. 9 illustrates, somewhat diagrammatically, an alternatively process for forming an embossed laminated material.

This figure illustrates an alternative process for forming a laminated structure 30 corresponding to the structure 13 of FIG. 8 and impressing a hologram upon it. FIG. 9 shows shows a cylinder 21 rotating on a shaft 22. The cylinder 21 carries a hologram in relief on its outer surface. The hologram is repeated at intervals about the periphery of the cylinder 21.

Transparent material from a suitable supply 23 is fed through a nozzle 24 and is deposited as a fluent sheet 25 on the surface of the rotating cylinder 21. A laminated web consisting of support layer 5 and release coat 8 is fed from a suitable source over a guide roller 26 so that it engages the outer surface of the sheet 25. The cylinder 21 may be heated at the point of contact of the sheet 25 with the laminated web. The sheet 25 is forced into contact with the relief holograms on the surface of cylinder 25. Part of the cylinder may be chilled, if necessary, before it reaches another guide roller 27 where the laminated material, now indicated at 30, is removed to a suitable take-up reel (not shown). In effect, the sheet 25 may be described as being cast between the die cylinder 21 and the laminated web including the support layer 5. The holograms are now impressed on the sheet of transparent material 25. The laminated material 30 leaving the guide roller 27 differs from the material of FIG. 5 in that a single transparent layer 25 is used in place of the two transparent layers 6 and 7 of FIG. 5.

A reflective surface, comparable to the foil 10 of FIG. 5, may then be placed on the transparent material 25 by depositing an aluminum coat thereon, for example, by vapor deposition or sputtering. The laminated material of FIG. 9 is then the equivalent of that shown in FIG. 8.

The substrate may be paper or a suitable substitute for paper. For example, the polyethylene film-fibril sheets shown in the U.S. Pat. No. 4,247,318, to Lee et al., may be used. Other suitable substrates may be employed, for example, rigid plastic such as are used for credit cards and the like.

The contours of the embossments are shown as rounded. The scale of the drawings is greatly enlarged. It is difficult to the point of impossibility to determine whether a particular peak or valley in an actual structure is sharp or rounded. The rounded showing is believed to be correct.

What is claimed is:

1. An article comprising a document or like supportive substrate having a surface bearing a hologram, produced by the successive steps of
    (a) establishing a laminate comprising a thin layer of transparent material capable of receiving a three-dimensional light-diffracting pattern, a support layer, and a heat-sensitive release layer bonding the transparent material layer to the support layer, such that a surface of the transparent material layer is exposed;
    (b) forming, on said exposed surface, a three-dimensional light-diffracting pattern comprising a hologram while maintaining the transparent material layer bonded to the support layer by the release layer, said exposed surface being vacuum-deposited with a reflective coating of metal and said pattern being formed in said metal as well as in said exposed surface;
    (c) applying, to said exposed surface, a layer of a heat-sensitive adhesive capable of providing a bond between the transparent material layer and the substrate, said transparent material layer having a shear strength less than that of said bond;
    (d) juxtaposing the laminate and the supportive substrate such that the adhesive layer is in contact with the substrate surface and the support layer is exposed;
    (e) applying heat and pressure to at least a region of the juxtaposed laminate and substrate in register with said pattern for simultaneously activating the adhesive layer and the release layer in said region to adhere the transparent material layer to the substrate surface in said region while releasing the transparent material layer from the support layer in said region; and
    (f) removing the support layer, together with any nonadhered portion of the transparent material layer, from the adhered transparent material layer in said region, leaving the adhered transparent material layer bearing said pattern bonded to said substrate.

2. An article as defined in claim 1, wherein step (b) is performed by embossing said pattern on said exposed surface.

3. An article as defined in claim 1, wherein step (e) is performed by selectively applying heat and pressure to only a limited region of the juxtaposed laminate and substrate such that there are portions of the release and adhesive layers outside said limited region which are not activated, whereby portions of the transparent material layer outside said limited region remain bonded to the support layer and nonadhered to the substrate and are removed with the substrate in step (f).

4. An article as defined in claim 1, wherein said transparent material is a thermoplastic material.

5. An article as defined in claim 4, wherein said release layer is a layer of a wax.

6. An article as defined in claim 5, wherein said support layer is a layer of polyester.

7. An article as defined in claim 1, wherein said substrate is paper.

8. An article as defined in claim 1, wherein said substrate is a plastic card.

9. An article as defined in claim 1, wherein said transparent material layer has a thickness of from 1 to 10 microns.

10. An article as defined in claim 1, wherein said coating of metal is less than 1,000 Angstroms thick.

* * * * *